(12) United States Patent
Wheeler (10) Patent No.: US 11,365,584 B2
(45) Date of Patent: Jun. 21, 2022

(54) PRESSURE BALANCED SEAL ASSEMBLY (71) Applicant: Halliburton Energy Services, Inc., Houston, TX (US)

(72) Inventor: Fraser A. Wheeler, Edmonton (CA)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 358 days.

(21) Appl. No.: 16/487,234

(22) PCT Filed: Apr. 3, 2017

(86) PCT No.: PCT/CA2017/050406
§ 371 (c)(1),
(2) Date: Aug. 20, 2019

(87) PCT Pub. No.: WO2018/184087
PCT Pub. Date: Oct. 11, 2018

(65) Prior Publication Data
US 2020/0181980 A1 Jun. 11, 2020

(51) Int. Cl.
*E21B 4/00* (2006.01)
*E21B 7/06* (2006.01)
(Continued)

(52) U.S. Cl.
CPC ............ *E21B 4/003* (2013.01); *E21B 7/062* (2013.01); *F16J 15/002* (2013.01);
(Continued)

(58) Field of Classification Search
CPC ......... E21B 4/003; E21B 7/062; F16J 15/002; F16J 15/3232; F16J 15/447; F16J 15/52
See application file for complete search history.

(56) References Cited

U.S. PATENT DOCUMENTS 2,877,026 A * 3/1959 Payne ............... F16L 39/04
277/365
2,907,611 A * 10/1959 Robinson ............ E21B 4/003
384/477
(Continued)

FOREIGN PATENT DOCUMENTS

WO 2015089620 A1 6/2015
WO 2015139108 A1 9/2015

OTHER PUBLICATIONS

Schlumberger, "PowerDrive Xceed", Product Sheet available at https://www.slb.com/-/media/files/drilling/product-sheet/powerdrive-xceed-ps, 2017 (2 pages).
(Continued)

*Primary Examiner* — Eugene G Byrd
(74) *Attorney, Agent, or Firm* — Parlee McLaws, LLP; Patrick Laycock; Craig W. Roddy (57) ABSTRACT

A seal assembly in an apparatus including a housing, a housing bore defined by the housing, a shaft extending through the housing bore, and a shaft bore defined by the shaft. The housing bore includes an annular seal chamber between the housing and the shaft. The seal assembly includes a flexible tubular seal surrounding the shaft within the seal chamber. The tubular seal has a shaft end sealingly connected with the shaft and a housing end sealingly connected with the housing. The tubular seal divides the seal chamber into an interior seal chamber which is sealed from an exterior of the housing and an exterior seal chamber which is sealed from an interior space of the housing. At least one seal pressure balancing port is defined by the shaft and extends between the shaft bore and the exterior seal chamber.

20 Claims, 3 Drawing Sheets

(51) Int. Cl.
*F16J 15/00* (2006.01)
*F16J 15/3232* (2016.01)
*F16J 15/447* (2006.01)
*F16J 15/52* (2006.01)

(52) U.S. Cl.
CPC ......... *F16J 15/3232* (2013.01); *F16J 15/447* (2013.01); *F16J 15/52* (2013.01)

(56) References Cited

U.S. PATENT DOCUMENTS

| | | | | |
|---|---|---|---|---|
| 3,807,513 | A * | 4/1974 | Kern | F16J 15/164 175/107 |
| 4,040,495 | A * | 8/1977 | Kellner | E21B 4/02 175/73 |
| 5,199,514 | A * | 4/1993 | Titus | E21B 4/003 175/107 |
| 5,875,859 | A * | 3/1999 | Ikeda | E21B 7/067 175/73 |
| 6,092,610 | A | 7/2000 | Kosmala et al. | |
| 6,109,372 | A * | 8/2000 | Dorel | E21B 47/08 175/61 |
| 6,769,499 | B2 | 8/2004 | Cargill et al. | |
| 6,837,315 | B2 * | 1/2005 | Pisoni | E21B 7/067 175/269 |
| 2011/0005839 | A1 * | 1/2011 | Marchand | F16D 3/845 175/92 |
| 2011/0148048 | A1 * | 6/2011 | Grosser | F16J 15/002 277/628 |
| 2011/0193295 | A1 * | 8/2011 | Dahlhaus-Preussler | F16J 15/002 277/500 |
| 2014/0062031 | A1 * | 3/2014 | Honzek | F16J 15/164 277/551 |
| 2016/0090789 | A1 | 3/2016 | Gajji et al. | |
| 2016/0222734 | A1 | 8/2016 | Winslow et al. | |
| 2016/0341316 | A1 * | 11/2016 | Baumann | F03B 11/006 |

OTHER PUBLICATIONS

Grundfos Management, "Mechanical Shaft Seal Types and Sealing Systems", Brochure available at http://machining.grundfos.com/media/16602/shaftseal_chapter2.pdf, Jan. 2011 (20 pages).

* cited by examiner

FIG. 3

PRESSURE BALANCED SEAL ASSEMBLY

TECHNICAL FIELD

A seal assembly including a flexible tubular seal which is pressure balanced in order to reduce the risk of collapse or failure of the seal.

BACKGROUND OF THE INVENTION

A seal assembly including a flexible tubular seal may be used to provide a seal between two components in environments where the two components may deflect, tilt or otherwise move relative to one another, since a flexible tubular seal may be able to accommodate these movements. Such environments may be encountered in the oil and gas industry, where tools which are deployed into boreholes may include components such as housings and shafts which may deflect, tilt or move relative to one another. A flexible tubular seal may present a relatively large surface area in providing a seal and may therefore be susceptible to collapse or failure if the differential pressure across the seal is excessive.

BRIEF DESCRIPTION OF DRAWINGS

Embodiments of the invention will now be described with reference to the accompanying drawings, in which:

FIGS. 3, 4, and 5 are longitudinal section views of a seal assembly in an apparatus for use in drilling a borehole, wherein FIG. 4 is a continuation of FIG. 3 depicting features of an exemplary embodiment of the seal assembly, and FIG. 5 is an alternate continuation of FIG. 3 depicting features of an alternate exemplary embodiment of the seal assembly.

DETAILED DESCRIPTION

This description is directed, in part, to a seal assembly comprising a flexible tubular seal for providing a seal between two components. The flexible tubular seal is pressure balanced in order to manage the differential pressure across the seal and thereby reduce the risk of collapse or failure of the seal.

The seal assembly described herein may be used in any suitable environment and/or in any suitable apparatus in which a seal is required. The seal assembly described herein may be particularly suited for use in environments in which the two components may deflect, tilt or otherwise move relative to one another.

As a non-limiting example, the seal assembly described herein may be included as a component in an apparatus which is configured to be inserted in a borehole, in which case the apparatus may be any suitable apparatus which may be inserted in a borehole for any purpose. As non-limiting examples, the apparatus may be an apparatus for use in drilling, completing, servicing, logging or surveying a borehole.

As a particular non-limiting example, the apparatus may be an apparatus for use in drilling a borehole. As non-limiting examples, an apparatus for use in drilling a borehole may comprise, consist of or consist essentially of a drilling motor, a rotary steerable drilling apparatus, a turbine, a reciprocating hammer, or any other apparatus which may be used in drilling a borehole.

The seal assembly may be used to provide a seal between any two suitable components of an apparatus. The two components may be arranged relative to each other in any suitable manner which facilitates the use of the seal assembly. As non-limiting examples, the two components may be arranged so that they are abutting or adjacent to each other, or may be arranged so that one of the components is received within the other component.

As a particular non-limiting example, one of the components may be a housing and the other of the components may be a mandrel which is received within the housing. As a non-limiting example, the mandrel may be a shaft which is received within the housing.

A shaft may be received within the housing in any manner. As non-limiting examples, a shaft may be received within the housing so that the shaft is rotatable and/or reciprocable relative to the housing, or a shaft may be received within and connected with the housing so that the shaft is rotatable and/or reciprocable with the housing.

The seal assembly comprises a flexible tubular seal and a seal pressure balancing device in communication with a side of the tubular seal.

The tubular seal may comprise, consist, or consist essentially of any flexible tubular structure, device and/or apparatus which is capable of providing a seal between the two components. The tubular seal may be constructed of any suitable material or combination of materials and may be provided in any configuration which is capable of performing a sealing function while providing a flexible seal.

As non-limiting examples, the tubular seal may be constructed of a suitable metal such as stainless steel or a suitable resilient material such as a suitable rubber or elastomer. A tubular seal constructed of a metal may be particularly suited for use in relatively harsh or demanding environments and/or in applications in which a relatively high differential pressure across the tubular seal is expected. A tubular seal constructed of a resilient material may be particularly suited for use in relatively less harsh or demanding environments and/or in applications in which a relatively low differential pressure across the tubular seal is expected.

As a non-limiting example, the tubular seal may comprise, consist of, or consist essentially of a bellows seal element.

The seal pressure balancing device may comprise any suitable structure, device and/or apparatus which is capable of providing a pressure balancing function to a side of the tubular seal in order to manage the differential pressure across the tubular seal. As a non-limiting example, the seal pressure balancing device may comprise, consist of, or consist essentially of one or more seal pressure balancing ports. As non-limiting examples, a seal pressure balancing port may comprise a passage, a conduit, an aperture, or any other suitable structure, device or apparatus.

The one or more seal pressure balancing ports may be defined by components of the seal assembly, by one or more structures separate from the seal assembly, and/or by one or more components of the apparatus in which the seal assembly is used.

The seal assembly may be used in an apparatus comprising a housing and a shaft. The housing and the shaft may constitute the two components between which the seal assembly provides a seal. The housing may define a housing bore. The shaft may define a shaft bore. The shaft may extend through the housing bore. The housing bore may comprise an annular seal chamber which is defined between the housing and the shaft.

The housing may have an exterior. The housing may have an interior space. The interior space of the housing may be defined between the housing and the shaft. The interior space of the housing may be isolated from the exterior of the housing by the seal assembly.

Where the seal assembly provides a seal between a housing and a shaft, the seal assembly may comprise a flexible tubular seal surrounding the shaft within the seal chamber, and one or more seal pressure balancing ports in communication with a side of the tubular seal. The tubular seal may have a shaft end sealingly connected with the shaft and a housing end sealingly connected with the housing. If the shaft is rotatable relative to the housing, the tubular seal may be rotatably connected with one or both of the shaft and the housing such that the seal assembly facilitates the relative rotation of the shaft and the housing.

The seal chamber may be divided by the tubular seal into an interior seal chamber which is sealed from the exterior of the housing and an exterior seal chamber which is sealed from the interior space of the housing. The interior seal chamber may be in pressure and/or fluid communication with the interior space of the housing, or the interior seal chamber may be fully or partially isolated from the interior space of the housing. The exterior seal chamber may be in pressure and/or fluid communication with the exterior of the housing, or the exterior seal chamber may be fully or partially isolated from the exterior of the housing.

Where the seal assembly provides a seal between a housing and a shaft, the one or more seal pressure balancing ports may be defined by the shaft and may extend between the shaft bore and the exterior seal chamber. As non-limiting examples, the one or more seal pressure balancing ports may be configured as passages, conduits and/or apertures which extend between the shaft bore and the exterior seal chamber.

The seal assembly may comprise a flow restrictor for restricting a flow of fluid through the one or more seal pressure balancing ports. The flow restrictor may comprise any suitable structure, device and/or apparatus or any combination of suitable structures, devices and/or apparatus.

As a first particular non-limiting example, the flow restrictor may comprise a partial restriction such as one or more orifices or nozzles which restricts fluid which passes through the one or more seal pressure balancing ports. As a second particular non-limiting example, the flow restrictor may comprise one or more valves such as check valves which permit fluid to pass through the one or more seal pressure balancing ports when a differential pressure between the shaft bore and the exterior seal chamber exceeds a differential pressure threshold. The flow restrictor may be positioned within the one or more seal pressure balancing ports, or may otherwise be in fluid communication with the one or more seal pressure balancing ports.

Where the seal assembly provides a seal between a housing and a shaft, the flow restrictor may be partially or completely defined by the shaft, may comprise one or more structures, devices and/or apparatus which are positioned within the one or more seal pressure balancing ports, or may comprise one or more structures, devices and/or apparatus which are in fluid communication with the one or more seal pressure balancing ports.

Where the seal assembly provides a seal between a housing and a shaft, the seal assembly may comprise a secondary seal positioned between the housing and the shaft. The secondary seal may be adjacent to the tubular seal. The secondary seal may assist in defining the exterior seal chamber. As a non-limiting example, the secondary seal may be positioned between the housing and the shaft such that the exterior seal chamber is defined between the tubular seal and the secondary seal. The secondary seal may comprise any suitable structure, device or apparatus which is capable of providing a full seal or a partial seal between the housing and the shaft.

A full seal may substantially prevent both debris and fluids from crossing the secondary seal. A secondary seal providing a full seal may comprise, consist, or consist essentially of any suitable structure, device or apparatus which is capable of providing a full seal.

A partial seal may substantially prevent debris from crossing the secondary seal while permitting limited fluid and/or pressure communication across the secondary seal. A secondary seal providing a partial seal may comprise, consist, or consist essentially of any suitable device or apparatus which is capable of providing a partial seal. As a non-limiting example, a secondary seal providing a partial seal may comprise a labyrinth seal.

Where the seal assembly provides a seal between a housing and a shaft, the seal assembly may comprise an apparatus pressure balancing device for providing pressure communication either between the shaft bore and the interior seal chamber or between the exterior of the housing and the interior seal chamber.

If the interior seal chamber is within the interior space of the housing or in pressure communication with the interior space of the housing, the apparatus pressure balancing device may provide pressure communication with the interior space of the housing. If the interior seal chamber is not within the interior space of the housing or in pressure communication with the interior space of the housing, the apparatus pressure balancing device may provide pressure communication directly with the interior seal chamber.

The apparatus pressure balancing device may comprise any suitable structure, device and/or apparatus which is capable of providing a pressure balancing function to the interior space of the housing and/or the interior seal chamber. As a non-limiting example, the apparatus pressure balancing device may comprise, consist of, or consist essentially of one or more apparatus pressure balancing ports. As non-limiting examples, an apparatus pressure balancing port may comprise a passage, a conduit, an aperture, or any other suitable structure, device or apparatus.

The one or more apparatus pressure balancing ports may be defined by the housing, by one or more structures separate from the housing, or by one or more other components of the apparatus in which the seal assembly is used. The one or more apparatus pressure balancing ports may extend between the shaft bore and the interior space of the housing, or may extend directly between the shaft bore and the interior seal chamber. Alternatively, the one or more apparatus pressure balancing ports may extend between the exterior of the housing and the interior space of the housing, or may extend directly between the exterior of the housing and the interior seal chamber.

The apparatus pressure balancing device may provide both pressure communication and fluid communication or may provide only pressure communication.

A lubricating fluid may be contained within the interior space of the housing and/or within the interior seal chamber. If a lubricating fluid is contained within the interior space of the housing and/or within the interior seal chamber, the apparatus pressure balancing device may comprise a pressure transmitting device for providing pressure communication with the interior space of the housing and/or with the interior seal chamber while inhibiting fluid communication. The pressure transmitting device may comprise, consist of, or consist essentially of any suitable structure, device and/or apparatus or any combination of suitable structures, devices and/or apparatus. As non-limiting examples, the pressure transmitting device may comprise, consist of, or consist essentially of one or more diaphragms and/or balancing pistons.

As a particular non-limiting example, the pressure transmitting device may comprise, consist of, or consist essentially of one or more balancing pistons which are positioned within the one or more apparatus pressure balancing ports and which are movable within the apparatus pressure balancing ports in order to transmit pressure.

Where the seal assembly provides a seal in an apparatus between a housing and a shaft, the shaft may have a distal end, and the apparatus may be configured so that a fluid may be passed through the shaft bore in a direction toward the distal end of the shaft. The housing may have a distal end, and the apparatus may be configured so that the seal assembly is positioned adjacent to the distal end of the housing. The apparatus may be configured so that the distal end of the shaft extends from the distal end of the housing.

A pressure drop device may be connectable directly or indirectly with the distal end of the shaft and in communication with the shaft bore. The pressure drop device may comprise, consist of, or consist essentially of any structure, device or apparatus which causes the fluid to undergo a pressure drop as a result of passing through the pressure drop device after passing through the shaft bore, regardless of whether the fluid undergoes an energy loss as it passes through the pressure drop device. As non-limiting examples, the pressure drop device may comprise a restriction for increasing the velocity of the fluid, or the pressure drop device may comprise an energy conversion device for converting fluid energy into some other form of energy.

In this configuration, the one or more seal pressure balancing ports may provide communication between the shaft bore and the exterior seal chamber proximally or upstream of the pressure drop device.

Where the seal assembly provides a seal in an apparatus between a housing and a shaft, the apparatus may be an apparatus which is suitable for use in a borehole for drilling the borehole, and the pressure drop device may comprise, consist of, or consist essentially of a drill bit. The drill bit may be any type of drill bit which is suitable for use in drilling a borehole. As non-limiting examples, the drill bit may be a movable cutter drill bit, a fixed cutter drill bit, a coring drill bit, or a reaming drill bit.

As non-limiting examples, a suitable apparatus for use in drilling a borehole may be a drilling motor or a rotary steerable drilling apparatus.

Such apparatus may be configured so that the shaft is rotatable relative to the housing. As non-limiting examples of this configuration, the apparatus may be a drilling motor in which the shaft comprises or is connected with a rotor and the housing comprises or is connected with a stator, or the apparatus may be a rotary steerable drilling apparatus in which the shaft comprises or is connected with a rotary drill string and the housing comprises or is connected with a non-rotating housing. In such configurations, the tubular seal of the seal assembly may be rotatably connected with one or both of the shaft and the housing such that the seal assembly facilitates the relative rotation of the shaft and the housing.

Such apparatus may alternatively be configured so that the shaft is rotatable with the housing. As a non-limiting example of this configuration, the apparatus may be a continuously rotating, fully rotating, or geostationary type of rotary steerable drilling apparatus in which the housing comprises or is connected with a rotary drill string, the shaft is connected with the housing so that the shaft is rotatable with the housing, and an internal rotating mechanism is provided within the housing which continuously adjusts the angle of the shaft relative to the housing so that the orientation of the shaft remains geostationary as the rotary drill string rotates.

FIGS. 1-5 are exemplary only. The seal assembly described herein may be used in any suitable apparatus and in any suitable application.

In the description of the exemplary embodiments which follows, features which are identical or equivalent in the exemplary embodiments may be identified with the same reference numbers.

Figure 1:
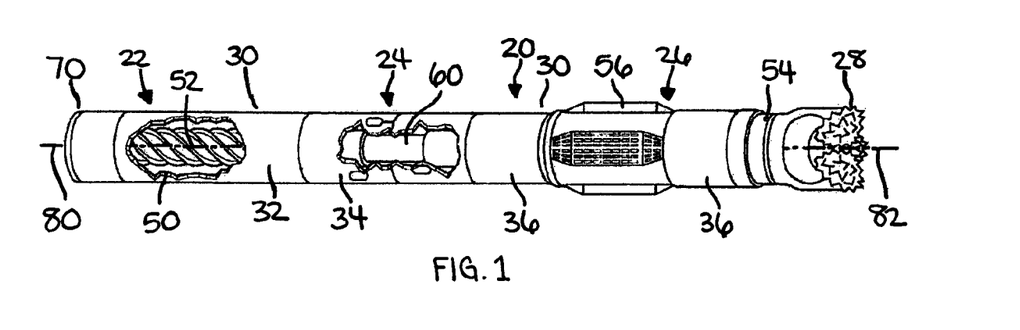
FIG. 1 is a pictorial view of a drilling motor for use in drilling a borehole.

Referring to FIG. 1, an exemplary drilling motor (20) comprises a power section (22) and a bearing section (26). The bearing section (26) is axially distal to the power section (22). One or more sections of the drilling motor (20) may be axially interposed between the power section (22) and the bearing section (26). As depicted in FIG. 1, the drilling motor (20) further comprises a transmission section (24) which is axially interposed between the power section (22) and the bearing section (26). These sections of the drilling motor (20) constitute components of a powertrain which utilizes fluid energy to rotate a drill bit (28). A drill string (70) is connected directly or indirectly with the proximal end of the power section (22).

The sections of the drilling motor (20) are contained within a tubular housing (30).

As depicted in FIG. 1, the housing (30) comprises a plurality of housing sections connected together with threaded connections, including a tubular power housing (32) for the power section (22), a tubular transmission housing (34) for the transmission section (24), and a tubular bearing housing (36) for the bearing section (26).

The power housing (32) may comprise a plurality of power housing components which together provide the power housing (32), or the power housing (32) may be a unitary power housing (32) which is formed from a single power housing component.

The transmission housing (34) may comprise a plurality of transmission housing components which together provide the transmission housing (34), or the transmission housing (34) may be a unitary transmission housing (34) which is formed from a single transmission housing component.

The bearing housing (36) may comprise a plurality of bearing housing components which together provide the bearing housing (36), or the bearing housing (36) may be a unitary bearing housing (36) which is formed from a single bearing housing component.

The power section (22) of the drilling motor (20) comprises a stator (50) and a rotor (52). The stator (50) is fixedly connected with the power housing (32), and the rotor (52) is rotatable within the stator (50) in response to fluid circulating through the power section (22).

As depicted in FIG. 1, the power section (22) is a Moineau-type power section in which the stator (50) and the rotor (52) are lobed. The rotor (52) has one fewer lobe than the stator (50), and rotates eccentrically within the stator (50).

The transmission section (24) accommodates and converts the eccentric movement of the rotor (52) to concentric rotation of a driveshaft (54) within the bearing section (26). The transmission section (24) also transmits rotational drive energy from the power section (22) to the bearing section (26).

As depicted in FIG. 1, the transmission section (24) comprises the transmission housing (34) and a transmission member or transmission shaft (60) which is connected between the rotor (52) and the driveshaft (54) such that eccentric rotation of the rotor (52) results in concentric rotation of the transmission shaft (60), and rotation of the transmission shaft (60) causes rotation of the driveshaft (54).

As depicted in FIG. 1, the bearing section (26) comprises the bearing housing (36), the driveshaft (54) and a bearing assembly (not shown) comprising one or more thrust bearings and radial bearings which rotatably support the driveshaft (54) within the housing (30). As depicted in FIG. 1, the bearing section (26) also comprises a stabilizer (56) which is threadably connected with the exterior of the bearing housing (36).

As depicted in FIG. 1, the drill bit (28) is connected directly or indirectly with the distal end of the driveshaft (54) so that rotation of the driveshaft (54) causes rotation of the drill bit (28).

The drilling motor (20) has a primary axis (80) and the driveshaft (54) has a driveshaft axis (82). As depicted in FIG. 1, the driveshaft axis (82) is oblique to the primary axis (80) so that there is a "bend" in the drilling motor (20). The bend in the drilling motor (20) may be provided by a bend in the exterior of the housing (30), by a bend in the interior of the housing (30), by an articulation of the driveshaft (54) within the housing (30), or in any other suitable manner.

Figure 3:
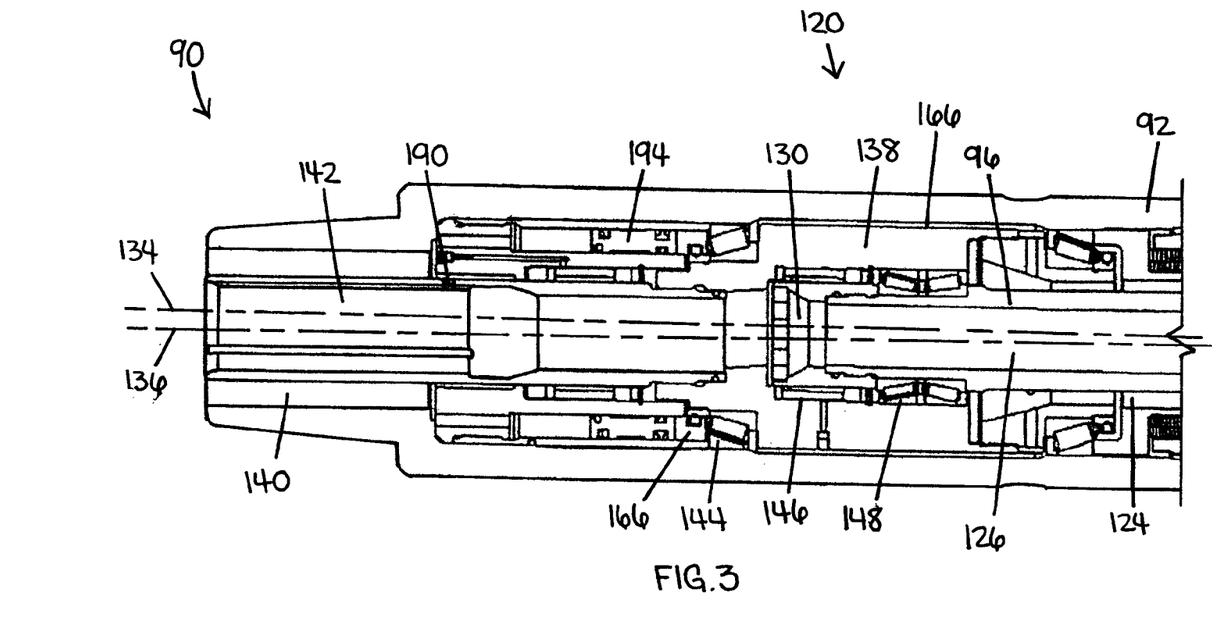
Figure 4:
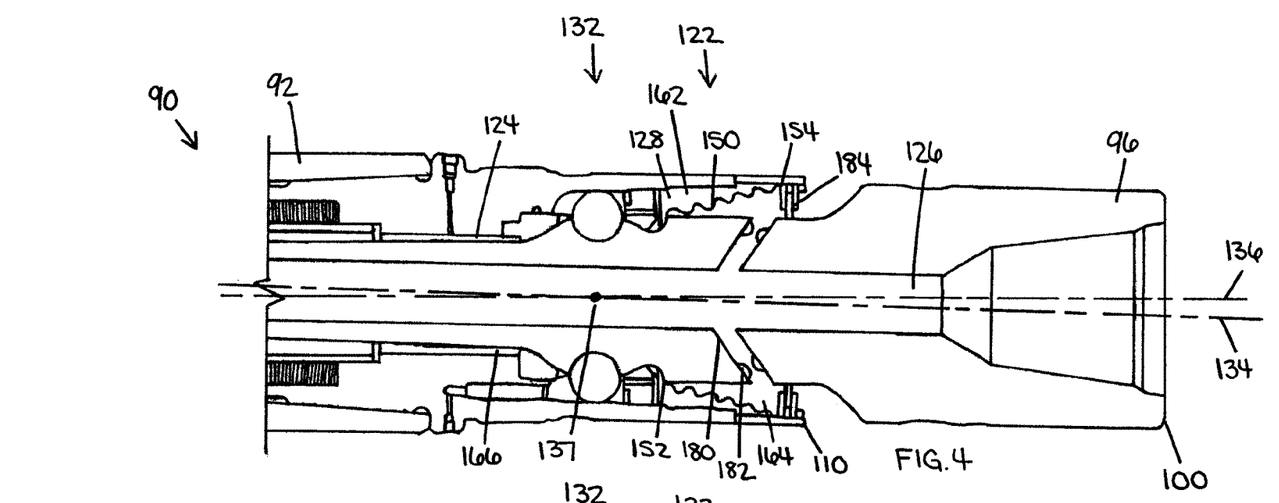
Figure 5:
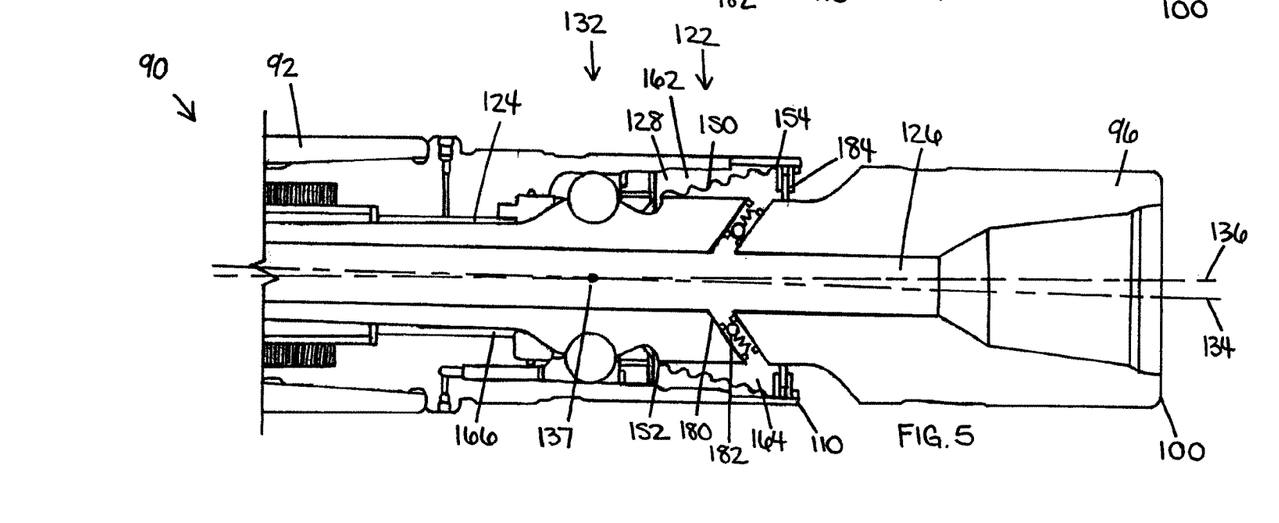

In the exemplary drilling motor (20) depicted in FIG. 1, a seal assembly (not shown in FIG. 1) is contained within the housing (30) adjacent to the distal end of the housing (30). The seal assembly may be a seal assembly as depicted in FIGS. 3-5, comprising a flexible tubular seal which provides a seal between the driveshaft (54) and the housing (30) when the driveshaft (54) and the housing (30) deflect, tilt, or otherwise move relative to one another, and which is pressure balanced in order to manage the differential pressure across the tubular seal. Since the driveshaft (54) in the drilling motor (20) is rotatable relative to the housing (30), one or more components of the seal assembly may be rotatably connected with one or both of the driveshaft (54) and the housing (30) such that the seal assembly facilitates the relative rotation of the driveshaft (54) and the housing (30).

Figure 2:
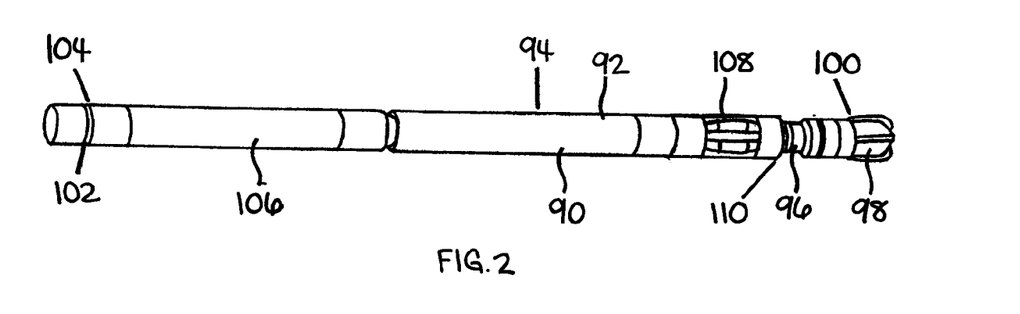
FIG. 2 is a pictorial view of a rotary steerable drilling apparatus for use in drilling a borehole.

Referring to FIG. 2, an exemplary rotary steerable drilling apparatus (90) comprises a housing (92) having an exterior (94). A shaft (96) extends through the housing (92). As depicted in FIG. 2, the drilling apparatus (90) is a continuously rotating, fully rotating, or geostationary type of rotary steerable drilling apparatus in which the shaft (96) is rotatable with the housing (92).

A drill bit (98) is connected directly or indirectly with a distal end (100) of the shaft (96) and a drill string (102) is connected directly or indirectly with a proximal end (104) of the housing (92). The drill string (102) may include a drill string communication system (106) such as a measurement-while-drilling system. A near-bit stabilizer (108) is connected with or integrated into the housing (92) adjacent to a distal end (110) of the housing (92).

A shaft deflector (not shown in FIG. 2) is contained within the housing (92). The shaft deflector may be configured to be actuatable to provide an adjustable deflection of the shaft (96) within the housing (92) during assembly and/or use of the drilling apparatus (90), or the shaft deflector may be configured to provide a fixed deflection of the shaft (96) within the housing (92).

The shaft deflector may comprise, consist of, or consist essentially of any structure, device or apparatus which is capable of causing the deflection of the shaft (96) within the housing (92). The deflection of the shaft (96) may result in bending of the shaft (96) within the housing (92). Additionally or alternatively, the deflection of the shaft (96) may result in tilting of the shaft (96) within the housing (92).

A seal assembly (not shown in FIG. 2) is contained within the housing (92) adjacent to the distal end (110) of the housing (92). The seal assembly provides a seal between the shaft (96) and the housing (92) as the shaft (96) bends and/or tilts within the housing (92), and is pressure balanced in order to manage the pressure differential across the seal.

FIG. 3 depicts additional features of the drilling apparatus (90) depicted in FIG. 2, including an exemplary shaft deflector (120) and some components of a seal assembly (122). FIG. 4 is a continuation of FIG. 3 and depicts additional features of the drilling apparatus (90) depicted in FIG. 2, including an exemplary embodiment of the seal assembly (122). FIG. 5 is an alternate continuation of FIG. 3 and depicts additional features of the drilling apparatus (90) depicted in FIG. 2, including an alternate exemplary embodiment of the seal assembly (122).

Referring to FIGS. 3-5, a housing bore (124) is defined by the housing (92) and a shaft bore (126) is defined by the shaft (96). The shaft (96) extends through the housing bore (124). An annular seal chamber (128) is defined between the housing (92) and the shaft (96). The distal end (100) of the shaft (96) extends from the distal end (110) of the housing (92).

Referring to FIG. 3, the shaft (96) comprises a joint (130) which facilitates deflection of the shaft (96) within the housing bore (124).

Referring to FIGS. 4-5, the drilling apparatus (90) comprises a fulcrum (132) which facilitates tilting of the shaft (96) within the housing (92). The fulcrum (132) supports the shaft (96) within the housing (92) such that the shaft (96) is both tiltable about the fulcrum (132) and rotatable with the housing (92).

The drilling apparatus (90) has a primary axis (134). The primary axis (134) is the axis of the housing (92). The shaft (96) has a shaft axis (136). The shaft axis (136) is the axis of rotation of the shaft (96) within the housing (92). When the shaft (96) is deflected by the shaft deflector (120), the shaft axis (136) is oblique to the primary axis (134), but intersects the primary axis (134) at an axis intersection point (137), wherein the axis intersection point (137) is located at the axial position of the fulcrum (124).

As depicted in FIG. 3, the shaft deflector (120) comprises a cam (138) for deflecting the shaft (96), a cam drive motor (140) for rotating the cam (138), and a cam drive linkage (142) between the cam (138) and the cam drive motor (140) for connecting the cam (138) with the cam drive motor (140).

As depicted in FIG. 3, the cam (138) comprises a ramp which translates axially within the housing (92) in order to deflect the shaft (96). The cam (138) is rotatably supported within the housing bore (124) by a shaft deflector bearing (144). The cam (138) defines a cam bore (146). The shaft (96) is rotatably supported within the cam bore (146) by a deflection bearing (148).

In operation of the drilling apparatus (90) as depicted in FIG. 3, the cam (138) is actuated by axial translation of the ramp in order to provide a desired deflection of the shaft (96), and the cam (138) is maintained geostationary during rotation of the housing (92) and the shaft (96) by the cam drive motor (140), which rotates the cam (138) at the same speed but in the opposite direction as the housing (92) and the shaft (96) are rotated.

As depicted in FIG. 3, the shaft deflector (120) is actuatable to provide an adjustable deflection of the shaft (96) within the housing (92) during assembly and/or use of the drilling apparatus (90). In other embodiments, the shaft deflector (120) may be configured to provide a fixed deflection of the shaft (96) within the housing (92) which is set during fabrication or assembly of the drilling apparatus (90).

FIG. 3 depicts some features of the seal assembly (122). FIG. 4 depicts features of an exemplary embodiment of the seal assembly (122) and FIG. 5 depicts features of an alternate exemplary embodiment of the seal assembly (122).

In exemplary embodiments, the seal assembly (122) is positioned adjacent to the distal end (110) of the housing (92) and provides a seal between the housing (92) and the shaft (96) as the shaft (96) tilts or otherwise moves relative to the housing (92).

The seal assembly (122) comprises a flexible tubular seal (150). The tubular seal (150) surrounds the shaft (96) within the seal chamber (128).

The tubular seal (150) may comprise, consist of, or consist essentially of any suitable flexible tubular seal device, may be constructed of any suitable material or combination of materials, and may be provided in any suitable configuration. In the exemplary embodiments depicted in FIGS. 4-5, the tubular seal (150) comprises a bellows seal element constructed of a suitable metal such as stainless steel.

The tubular seal (150) has a shaft end (152) sealingly connected with the shaft (96) and a housing end (154) sealingly connected with the housing (92) so that the seal chamber (128) is divided by the tubular seal (150) into an interior seal chamber (162) which is sealed from the exterior (94) of the housing (92), and an exterior seal chamber (164) which is sealed from an interior space (166) of the housing (92), wherein the interior space (166) of the housing (92) is defined between the housing (92) and the shaft (96).

The seal assembly (122) further comprises a seal pressure balancing device in communication with the tubular seal (150), for providing a pressure balancing function to the exterior seal chamber (164) in order to manage the differential pressure across the tubular seal (150). The seal pressure balancing device may comprise any suitable structure, device, or apparatus which is capable of providing a pressure balancing function to the exterior seal chamber (164).

In exemplary embodiments, the seal pressure balancing device comprises at least one seal pressure balancing port (180). In the exemplary embodiments depicted in FIGS. 4-5, the seal pressure balancing device comprises two seal pressure balancing ports (180). In other embodiments, the seal assembly (122) may comprise one seal pressure balancing port (180) or more than two seal pressure balancing ports (180).

In exemplary embodiments, the seal pressure balancing ports (180) are defined by the shaft (96) and extend between the shaft bore (126) and the exterior seal chamber (164).

The seal assembly (122) further comprises a flow restrictor (182) for restricting a flow of fluid through the seal pressure balancing ports (180).

The flow restrictor (182) may comprise, consist of, or consist essentially of any suitable structure, device, and/or apparatus or combination of suitable structures, devices and/or apparatus. In the exemplary embodiment depicted in FIG. 4, the flow restrictor (182) comprises nozzles which provide a partial restriction and are positioned within each of the two seal pressure balancing ports (180). In the alternate exemplary embodiment depicted in FIG. 5, the flow restrictor (182) comprises check valves positioned within each of the two seal pressure balancing ports (180), which permit fluid to pass through the seal pressure balancing ports (180) when a differential pressure between the shaft bore (126) and the exterior seal chamber (164) exceeds a differential pressure threshold.

In other embodiments in which the seal pressure balancing device comprises more than one seal pressure balancing port (180), some of the seal pressure balancing ports (180) may not be provided with the flow restrictor (182), and/or different types of flow restrictor (182) may be provided for different seal pressure balancing ports (180).

In exemplary embodiments, the seal assembly (122) further comprises a secondary seal (184) positioned between the housing (92) and the shaft (96) such that the exterior seal chamber (164) is defined between the tubular seal (150) and the secondary seal (184).

In the exemplary embodiments, the secondary seal (184) comprises a partial seal such as a labyrinth seal, so that the secondary seal (184) restricts debris from entering the exterior seal chamber (164) and permits limited fluid communication between the exterior of the housing (92) and the exterior seal chamber (164).
se In exemplary embodiments, the seal assembly (122) further comprises an apparatus pressure balancing device for providing pressure communication between the shaft bore (126) and the interior seal chamber (162). In exemplary embodiments, the apparatus pressure balancing device comprises at least one apparatus pressure balancing port (190). In the exemplary embodiments depicted in FIGS. 3-5, the apparatus pressure device comprises one apparatus pressure balancing port (190).

In the exemplary embodiments depicted in FIGS. 3-5, the interior seal chamber (162) is within the interior space (166) of the housing or is in pressure and fluid communication with the interior space (166) of the housing (166). As a result, in the exemplary embodiments depicted in FIGS. 3-5, the apparatus pressure balancing port (190) extends between the shaft bore (126) and the interior space (166) of the housing (92) so that the apparatus pressure balancing port (190) provides pressure communication between the shaft bore (126) and the interior seal chamber (162).

In the drilling apparatus (90) as depicted in FIGS. 2-5, a lubricating fluid is contained within the interior space (166) of the housing (92) and within the interior seal chamber (162). As a result, in order to avoid contamination of the lubricating fluid, the apparatus pressure balancing device comprises a pressure transmitting device for providing pressure communication between the shaft bore (126) and the interior seal chamber (162) while inhibiting fluid communication between the shaft bore (126) and the interior seal chamber (162) via the apparatus pressure balancing port (190). In the exemplary embodiments depicted in FIGS. 2-5, the pressure transmitting device comprises a balancing piston (194) which is positioned within the apparatus pressure balancing port (190).

Referring to FIGS. 2-5, the distal end (100) of the shaft (96) is connected with the drill bit (98) so that the drill bit (98) is in fluid communication with the shaft bore (126).

During use of the drilling apparatus (90) in drilling a borehole (not shown), a fluid such as a drilling fluid may be passed through the shaft bore (126) in a direction toward the distal end (100) of the shaft (96) and may then be passed through the drill bit (98) after passing through the shaft bore (126). The fluid will undergo a pressure drop as it passes through the drill bit (98) so that the drill bit (98) functions as a pressure drop device. In other embodiments and/or apparatus, the distal end (100) of the shaft (96) may be connectable with a pressure drop device other than the drill bit (98), or the distal end (100) of the shaft (96) may be connectable with a pressure drop device in addition to the drill bit (98).

As a result, the fluid circulates through the shaft bore (126) toward the distal end (100) of the shaft (96), passes through the drill bit (98) where it undergoes a pressure drop as it exits the drilling apparatus (90), and then circulates toward the proximal end (104) of the housing (92) within the annulus (not shown) which exists between the exterior (94) of the housing (92) and the borehole.

In addition, a relatively small portion of the fluid which passes through the shaft bore (126) is diverted through the seal pressure balancing ports (180) into the exterior seal chamber (164) and then through the secondary seal (184) into the annulus. The amount of the fluid which is diverted through the seal pressure balancing ports (180) is controlled by the flow restrictor (182) and by the extent to which the secondary seal (184) permits fluid communication between the exterior seal chamber (164) and the exterior (94) of the housing (92). The diversion of fluid into the exterior seal chamber (164) and through the secondary seal (184) may also assist in flushing solid material from the exterior seal chamber (164), which may in turn reduce the risk of pack-off of the tubular seal (150) by the accumulation of solid particles in the exterior seal chamber (164).

In an apparatus such as the drilling apparatus (90) as depicted in FIGS. 2-5, the fluid within the shaft bore (126) will have a shaft bore pressure and the fluid immediately after exiting the drill bit (98) will have an annulus pressure. The annulus pressure will be lower than the shaft bore pressure as a result of the fluid undergoing a pressure drop as it passes through the drill bit (98).

In an apparatus which includes an apparatus pressure balancing device but does not include the seal assembly (122) described herein with a seal pressure balancing device, the pressure within the interior seal chamber (162) will approximately be equal to the shaft bore pressure and the pressure within the exterior seal chamber (164) will approximately be equal to the annulus pressure. If the difference between the shaft bore pressure and the annulus pressure is excessive, the pressure differential across the flexible seal (150) may tend to cause the flexible seal (150) to collapse around the shaft (96) and/or burst. Such an excessive pressure differential may result if the fluid undergoes a large pressure drop as it passes through the drill bit (98) and/or other pressure drop device, which may occur if the drill bit (98) and/or other pressure drop device becomes partially or completely plugged.

In an apparatus which includes an apparatus pressure balancing device and also includes the seal assembly (122) as described herein with a seal pressure balancing device, the pressure within the interior seal chamber (162) will approximately be equal to the shaft bore pressure and the pressure within the exterior seal chamber (164) will likely be higher than the annulus pressure. As a result, the pressure differential across the flexible seal (150) may be reduced and the risk of collapse and/or bursting of the flexible seal (150) may also be reduced.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

Additional Disclosures

The following are non-limiting, specific embodiments of the seal assembly described herein:

Embodiment A

A seal assembly in an apparatus comprising a housing, a housing bore defined by the housing, a shaft extending through the housing bore, and a shaft bore defined by the shaft, wherein the housing bore comprises an annular seal chamber which is defined between the housing and the shaft, the seal assembly comprising:
 (a) a flexible tubular seal surrounding the shaft within the seal chamber, wherein the tubular seal has a shaft end sealingly connected with the shaft and a housing end sealingly connected with the housing so that the seal chamber is divided by the tubular seal into an interior seal chamber which is sealed from an exterior of the housing and an exterior seal chamber which is sealed from an interior space of the housing; and
 (b) at least one seal pressure balancing port defined by the shaft and extending between the shaft bore and the exterior seal chamber.

Embodiment B

The seal assembly of Embodiment A, further comprising a secondary seal positioned between the housing and the shaft such that the exterior seal chamber is defined between the tubular seal and the secondary seal.

Embodiment C

The seal assembly of Embodiment B wherein the secondary seal restricts debris from entering the exterior seal chamber and permits limited fluid communication between the exterior seal chamber and the exterior of the housing.

Embodiment D

The seal assembly of Embodiment C wherein the secondary seal comprises a labyrinth seal.

Embodiment E

The seal assembly of any one of Embodiments A through D wherein the tubular seal comprises a bellows seal element.

Embodiment F

The seal assembly of any one of Embodiments A through E, further comprising a flow restrictor for restricting a flow of fluid through the at least one seal pressure balancing port.

Embodiment G

The seal assembly of Embodiment F wherein the flow restrictor comprises a partial restriction which restricts fluid which passes through the at least one seal pressure balancing port.

Embodiment H

The seal assembly of Embodiment F wherein the flow restrictor comprises a valve which permits fluid to pass through the at least one seal pressure balancing port when a differential pressure between the shaft bore and the exterior seal chamber exceeds a differential pressure threshold.

Embodiment I

The seal assembly of any one of Embodiments A through H, further comprising an apparatus pressure balancing device for providing pressure communication between the shaft bore and the interior seal chamber.

Embodiment J

The seal assembly of Embodiment I wherein the apparatus pressure balancing device comprises at least one apparatus pressure balancing port for providing pressure communication between the shaft bore and the interior seal chamber, and wherein the apparatus pressure balancing device further comprises a pressure transmitting device positioned within each of the apparatus pressure balancing ports for providing pressure communication between the shaft bore and the interior seal chamber while inhibiting fluid communication between the shaft bore and the interior seal chamber.

Embodiment K

The seal assembly of any one of Embodiments A through J wherein a lubricating fluid is contained within the interior seal chamber.

Embodiment L

The seal assembly of any one of Embodiments A through K wherein the shaft is connected with the housing such that the shaft is rotatable with the housing.

Embodiment M

The seal assembly of any one of Embodiments A through L wherein the shaft has a distal end, wherein a fluid may be passed through the shaft bore in a direction toward the distal end of the shaft, wherein the distal end of the shaft is connectable with a pressure drop device so that the fluid may be passed through the pressure drop device after passing through the shaft bore, and wherein passing the fluid through the pressure drop device causes the fluid to undergo a pressure drop.

Embodiment N

The seal assembly of Embodiment M wherein the housing has a distal end, wherein the seal assembly is positioned adjacent to the distal end of the housing, and wherein the distal end of the shaft extends from the distal end of the housing.

Embodiment O

The seal assembly of any one of Embodiments A through N wherein the apparatus is an apparatus for use in a borehole.

Embodiment P

The seal assembly of Embodiment O wherein the apparatus is an apparatus for use in drilling a borehole and wherein the pressure drop device comprises a drill bit.

Embodiment Q

The seal assembly of Embodiment O wherein the apparatus is a rotary steerable drilling apparatus and wherein the pressure drop device comprises a drill bit.

Embodiment R

The seal assembly of any one of Embodiments O through Q, further comprising a secondary seal positioned between the housing and the shaft such that the exterior seal chamber is defined between the tubular seal and the secondary seal.

Embodiment S

The seal assembly of any one of Embodiments O through R, further comprising a flow restrictor for restricting a flow of fluid through the at least one seal pressure balancing port.

Embodiment T

The seal assembly of any one of Embodiments O through S, further comprising an apparatus pressure balancing device for providing pressure communication between the shaft bore and the interior seal chamber.

I claim:

1. A seal assembly in an apparatus comprising a housing, a housing bore defined by the housing, a shaft extending through the housing bore, and a shaft bore defined by the shaft, wherein the housing bore comprises an annular seal chamber which is defined between the housing and the shaft, the seal assembly comprising:
    a flexible tubular seal surrounding the shaft within the seal chamber, wherein the tubular seal has a shaft end sealingly connected with the shaft and a housing end sealingly connected with the housing so that the seal chamber is divided by the tubular seal into an interior seal chamber which is sealed from an exterior of the housing and an exterior seal chamber which is sealed from an interior space of the housing;
    at least one seal pressure balancing port defined by the shaft and extending between the shaft bore and the exterior seal chamber; and
    a flow restrictor positioned within the at least one seal pressure balancing port.

2. The seal assembly as claimed in claim 1, further comprising a secondary seal positioned between the housing and the shaft such that the exterior seal chamber is defined between the tubular seal and the secondary seal.

3. The seal assembly as claimed in claim 2 wherein the secondary seal comprises a labyrinth seal and wherein the labyrinth seal provides a partial seal which restricts debris from entering the exterior seal chamber and permits limited fluid communication between the exterior seal chamber and the exterior of the housing.

4. The seal assembly as claimed in claim 1 wherein the tubular seal comprises a bellows seal element.

5. The seal assembly as claimed in claim 1, wherein the flow restrictor comprises a nozzle which restricts fluid which passes through the at least one seal pressure balancing port.

6. The seal assembly as claimed in claim 1, wherein the flow restrictor comprises a valve which permits fluid to pass through the at least one seal pressure balancing port when a differential pressure between the shaft bore and the exterior seal chamber exceeds a differential pressure threshold.

7. The seal assembly as claimed in claim 1, further comprising an apparatus pressure balancing device for providing pressure communication between the shaft bore and the interior seal chamber.

8. The seal assembly as claimed in claim 7, wherein the apparatus pressure balancing device comprises at least one apparatus pressure balancing port for providing pressure communication between the shaft bore and the interior seal chamber, and wherein the housing pressure balancing device further comprises a pressure transmitting device positioned within each of the apparatus pressure balancing ports for providing pressure communication between the shaft bore and the interior seal chamber while inhibiting fluid communication between the shaft bore and the interior seal chamber.

9. The seal assembly as claimed in claim 8 wherein a lubricating fluid is contained within the interior seal chamber.

10. The seal assembly as claimed in claim 1 wherein the shaft is connected with the housing such that the shaft is rotatable with the housing.

11. The seal assembly as claimed in claim 10 wherein the shaft has a distal end, wherein a fluid may be passed through the shaft bore in a direction toward the distal end of the shaft, wherein the distal end of the shaft is connectable with a pressure drop device so that the fluid may be passed through the pressure drop device after passing through the shaft bore, and wherein passing the fluid through the pressure drop device causes the fluid to undergo a pressure drop.

12. The seal assembly as claimed in claim 11 wherein the housing has a distal end, wherein the seal assembly is positioned adjacent to the distal end of the housing, and wherein the distal end of the shaft extends from the distal end of the housing.

13. The seal assembly as claimed in claim 12 wherein the apparatus is an apparatus for use in a borehole.

14. The seal assembly as claimed in claim 12 wherein the apparatus is an apparatus for use in drilling a borehole and wherein the pressure drop device comprises a drill bit.

15. The seal assembly as claimed in claim 12 wherein the apparatus is a rotary steerable drilling apparatus and wherein the pressure drop device comprises a drill bit.

16. The seal assembly as claimed in claim 15, further comprising a secondary seal positioned between the housing and the shaft such that the exterior seal chamber is defined between the tubular seal and the secondary seal.

17. The seal assembly as claimed in claim 16 wherein the secondary seal comprises a labyrinth seal and wherein the labyrinth seal provides a partial seal which restricts debris from entering the exterior seal chamber and permits limited fluid communication between the exterior seal chamber and the exterior of the housing.

18. The seal assembly as claimed in claim 16, wherein the flow restrictor comprises a nozzle which restricts fluid which passes through the at least one seal pressure balancing port.

19. The seal assembly as claimed in claim 16, wherein the flow restrictor comprises a valve which permits fluid to pass through the at least one seal pressure balancing port when a differential pressure between the shaft bore and the exterior seal chamber exceeds a differential pressure threshold.

20. A seal assembly in an apparatus comprising a housing, a housing bore defined by the housing, a shaft extending through the housing bore, and a shaft bore defined by the shaft, wherein the housing bore comprises an annular seal chamber which is defined between the housing and the shaft, the seal assembly comprising:

a flexible tubular seal surrounding the shaft within the seal chamber, wherein the tubular seal has a shaft end sealingly connected with the shaft and a housing end sealingly connected with the housing so that the seal chamber is divided by the tubular seal into an interior seal chamber which is sealed from an exterior of the housing and an exterior seal chamber which is sealed from an interior space of the housing;

at least one seal pressure balancing port defined by the shaft and extending between the shaft bore and the exterior seal chamber; and an apparatus pressure balancing device for providing pressure communication between the shaft bore and the interior seal chamber.

* * * * *